May 21, 1940.  T. TARISIEN  2,201,564
FLUID PRESSURE BRAKE
Filed March 16, 1939  4 Sheets-Sheet 1

INVENTOR
THEOPHILE TARISIEN
BY
ATTORNEY

May 21, 1940.  T. TARISIEN  2,201,564
FLUID PRESSURE BRAKE
Filed March 16, 1939  4 Sheets-Sheet 2

INVENTOR
THEOPHILE TARISIEN
BY
ATTORNEY

May 21, 1940.   T. TARISIEN   2,201,564
FLUID PRESSURE BRAKE
Filed March 16, 1939   4 Sheets-Sheet 3
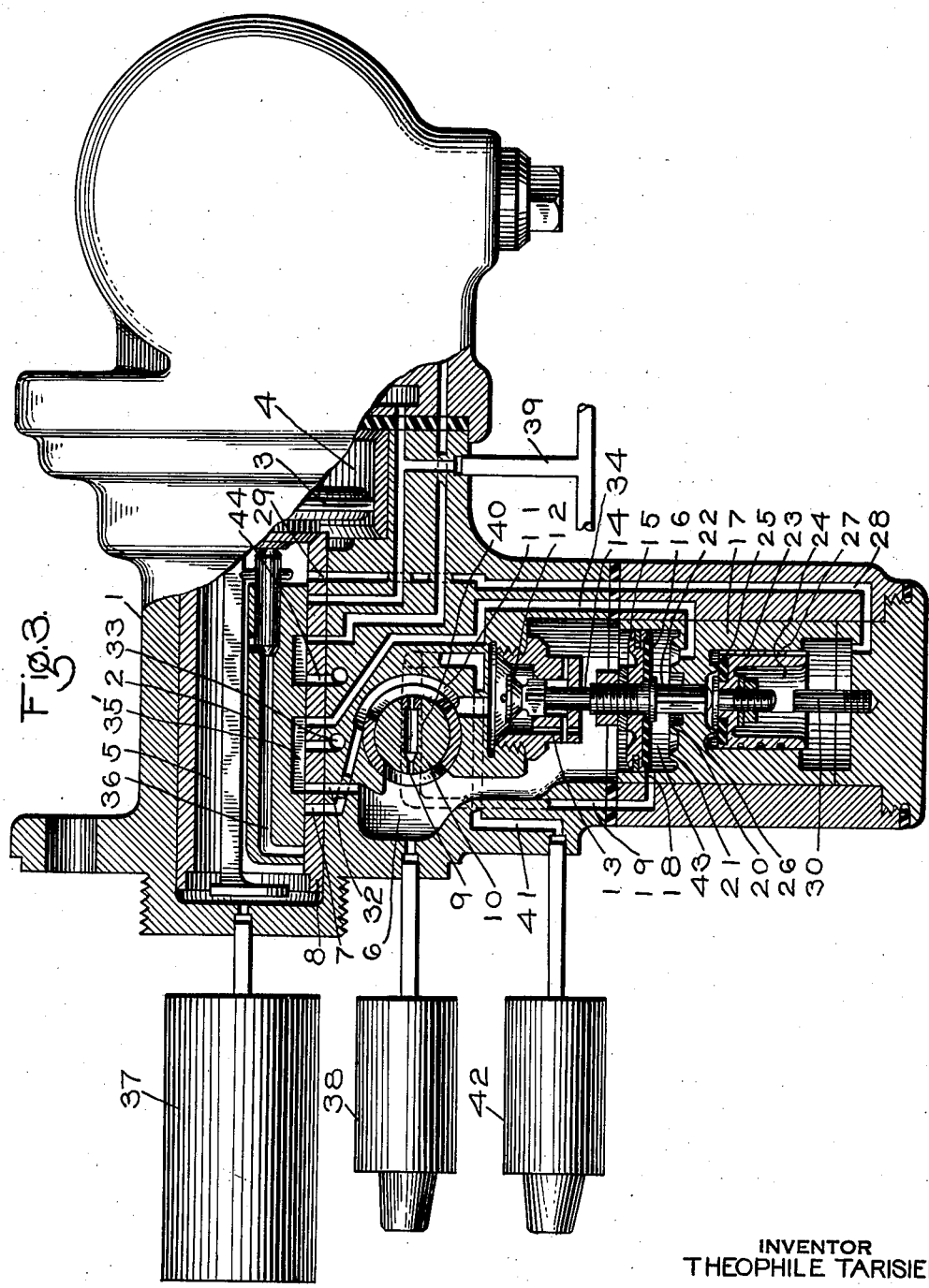
INVENTOR
THEOPHILE TARISIEN
BY
ATTORNEY May 21, 1940.  T. TARISIEN  2,201,564
FLUID PRESSURE BRAKE
Filed March 16, 1939  4 Sheets-Sheet 4
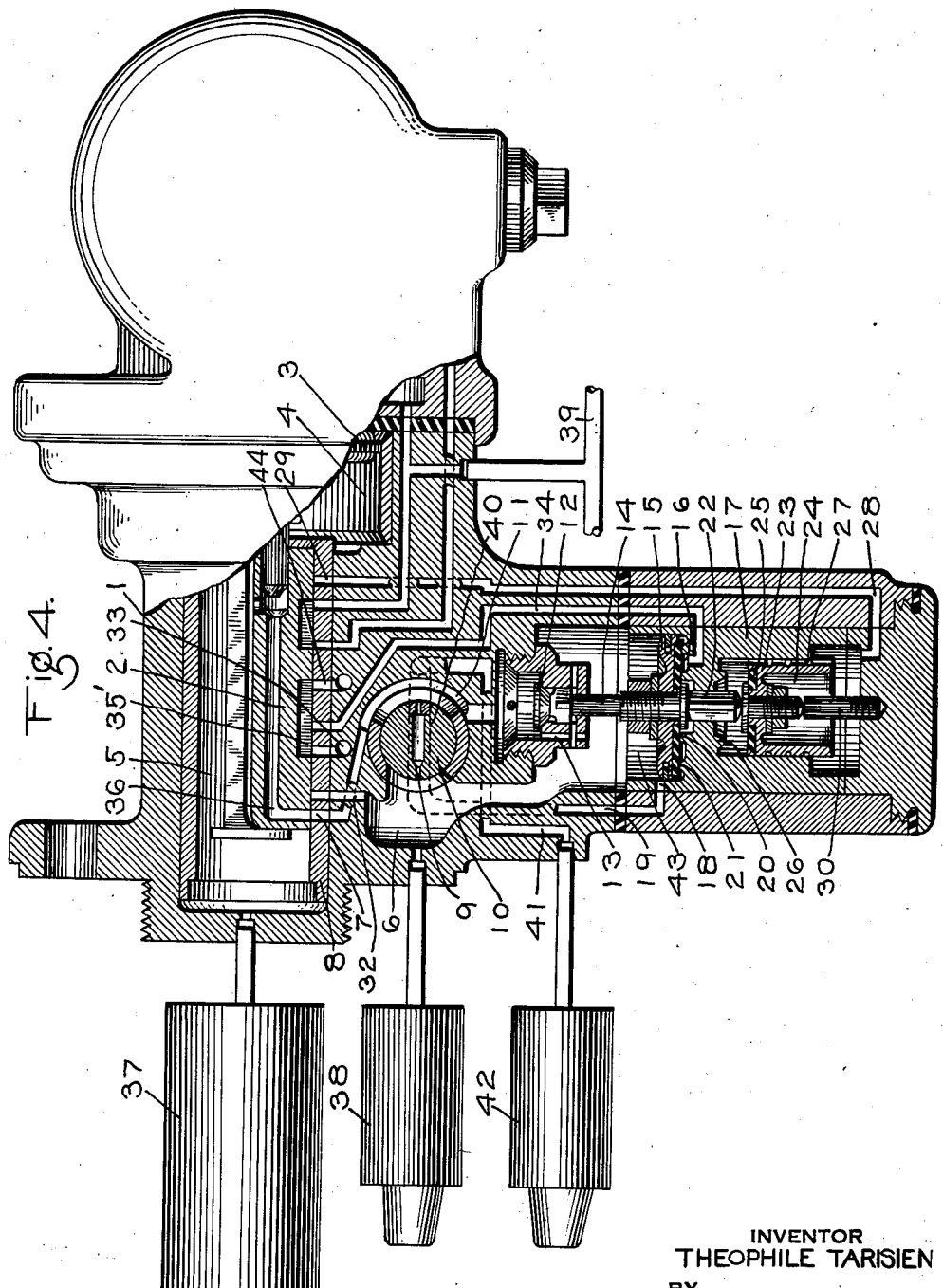
INVENTOR
THEOPHILE TARISIEN
BY
ATTORNEY Patented May 21, 1940

2,201,564

UNITED STATES PATENT OFFICE 2,201,564

FLUID PRESSURE BRAKE

Theophile Tarisien, Livry-Gargan, France, assignor, by mesne assignments, to The Westinghouse Air Brake Company, Wilmerding, Pa., a corporation of Pennsylvania Application March 16, 1939, Serial No. 262,103
In France March 17, 1938

10 Claims. (Cl. 303—23)

This invention relates to fluid pressure braking apparatus for railway and other vehicles of the kind comprising a triple valve device or other form of distributing valve device under the control of an automatic brake pipe and adapted to effect the supply of fluid under pressure to the brake cylinder or cylinders of the apparatus in two distinct stages during the first of which a relatively unrestricted flow of fluid is permitted so as rapidly to apply the brake blocks to the wheels or other braking surfaces while during the second stage a relatively slow and restricted flow of fluid under pressure is effected so as to cause a gradual development of the braking pressure to the required value.

This two-stage action is usually effected by a regulating valve device comprising a piston or other form of movable abutment subject to brake cylinder pressure and to the opposing action of a control spring, this abutment being arranged, when the brake cylinder pressure attains a value corresponding to the pressure exerted by the spring, to close a regulating valve permitting relatively unrestricted flow of fluid to the brake cylinder which is thereafter supplied with fluid only through a relatively restricted port or passage.

In braking apparatus of this type comprising an auxiliary or load brake cylinder or cylinders adapted to be rendered operative only when the vehicle is loaded, the movable abutment of the regulating valve device above described is arranged also to control the supply of fluid to the auxiliary or load brake cylinder or cylinders, this being effected during the second stage of the supply of fluid to the ordinary brake cylinder or cylinders.

The invention has for its object to provide an improved form of regulating valve device for braking apparatus of this character adapted to effect the various operations above described and also to insure and facilitate the rapid and complete venting of fluid under pressure from the auxiliary or load brake cylinder or cylinders at the end of the release of the brakes.

According to one feature of the present invention the operation of the regulating valve is arranged to be effected by two movable abutments of different effective areas, one of which is subject to brake cylinder pressure, and the other to the action of fluid under pressure in a chamber, these pressures acting upon the two abutments in opposite directions to effect the displacement of the regulating valve as soon as a predetermined brake pressure in the cylinder is attained.

According to another feature of the invention one of the movable abutments is arranged to effect the restricted supply of fluid under pressure to and its release from the auxiliary or load brake cylinder or cylinders when the latter is operative.

The invention is illustarted by way of example in the accompanying drawings, Fig. 1 of which is a view in sectional elevation of a triple valve device embodying a regulating valve constructed and arranged in accordance with one form of the invention, the parts of the device being shown in their normal or release position. Fig. 2 is a view similar to Fig. 1 but showing the parts of the device in the application position.

Fig. 3 is a view similar to Fig. 1 in which the pieces are in release position, but showing a modified and improved form.

Fig. 4 is similar to the preceding figures the pieces being shown in application position and comprising the improvement which is also shown in Fig. 3.

Fig. 5 is a detailed view of the rotary cock taken on line 5—5 of Fig. 1.

Figure 1:
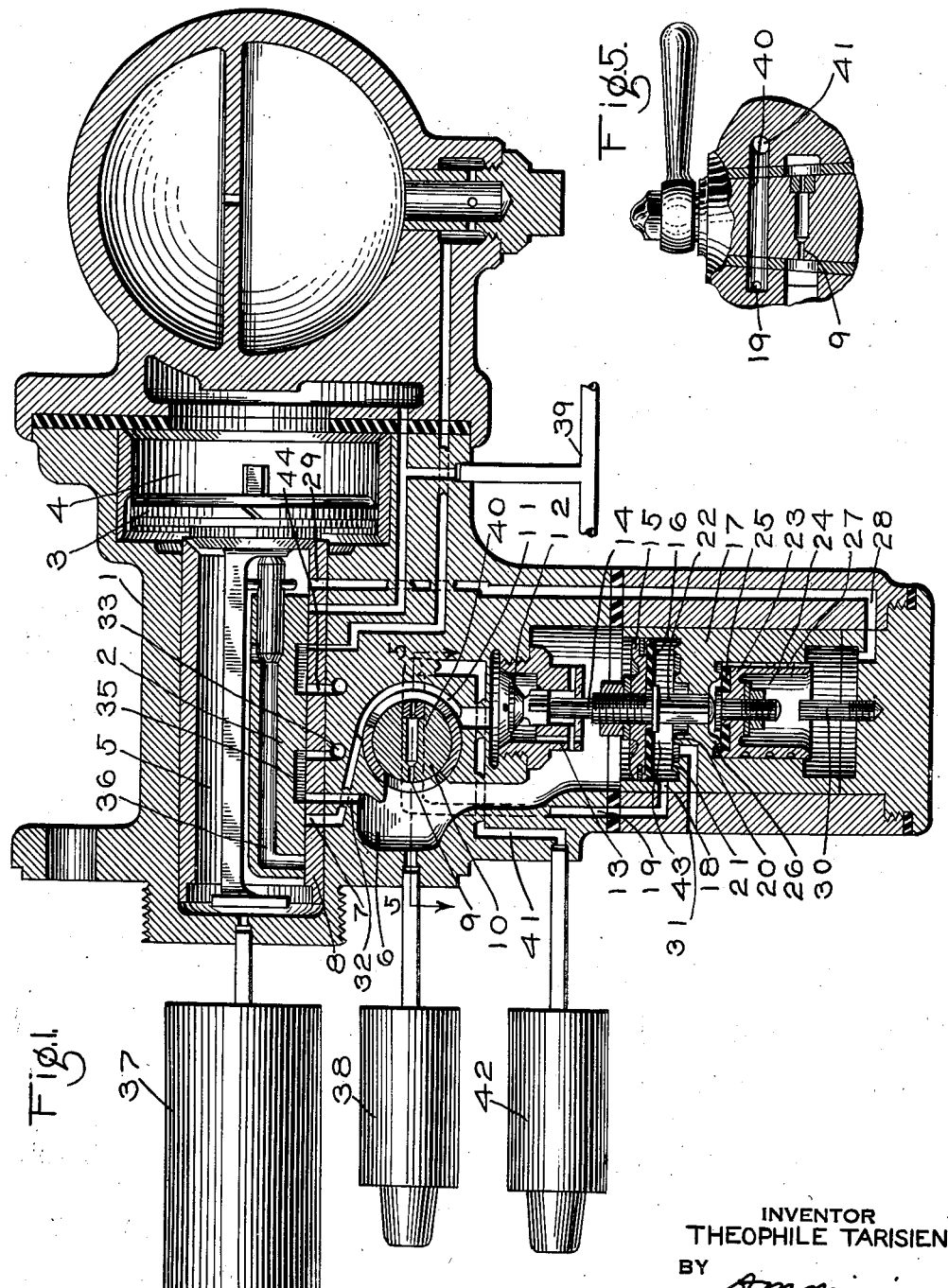

Referring now to the drawings, the triple valve device comprises a body portion 1 containing a slide valve 2 located in a chamber 5 in permanent communication with an auxiliary reservoir 37. The slide valve 2 is operated by a piston 3 located in a chamber 4 in permanent communication with a brake pipe 39.

The slide valve 2 is provided with a service port 36 which in application position communicates with a brake cylinder port 7 in the slide valve seat 8 leading to the usual or empty brake cylinder 38. The slide valve 2 is also provided with a cavity 35 for connecting the port 32 with the exhaust port 33 in the slide valve seat 8 in release position, all of which may be of the well known construction.

Figure 2:
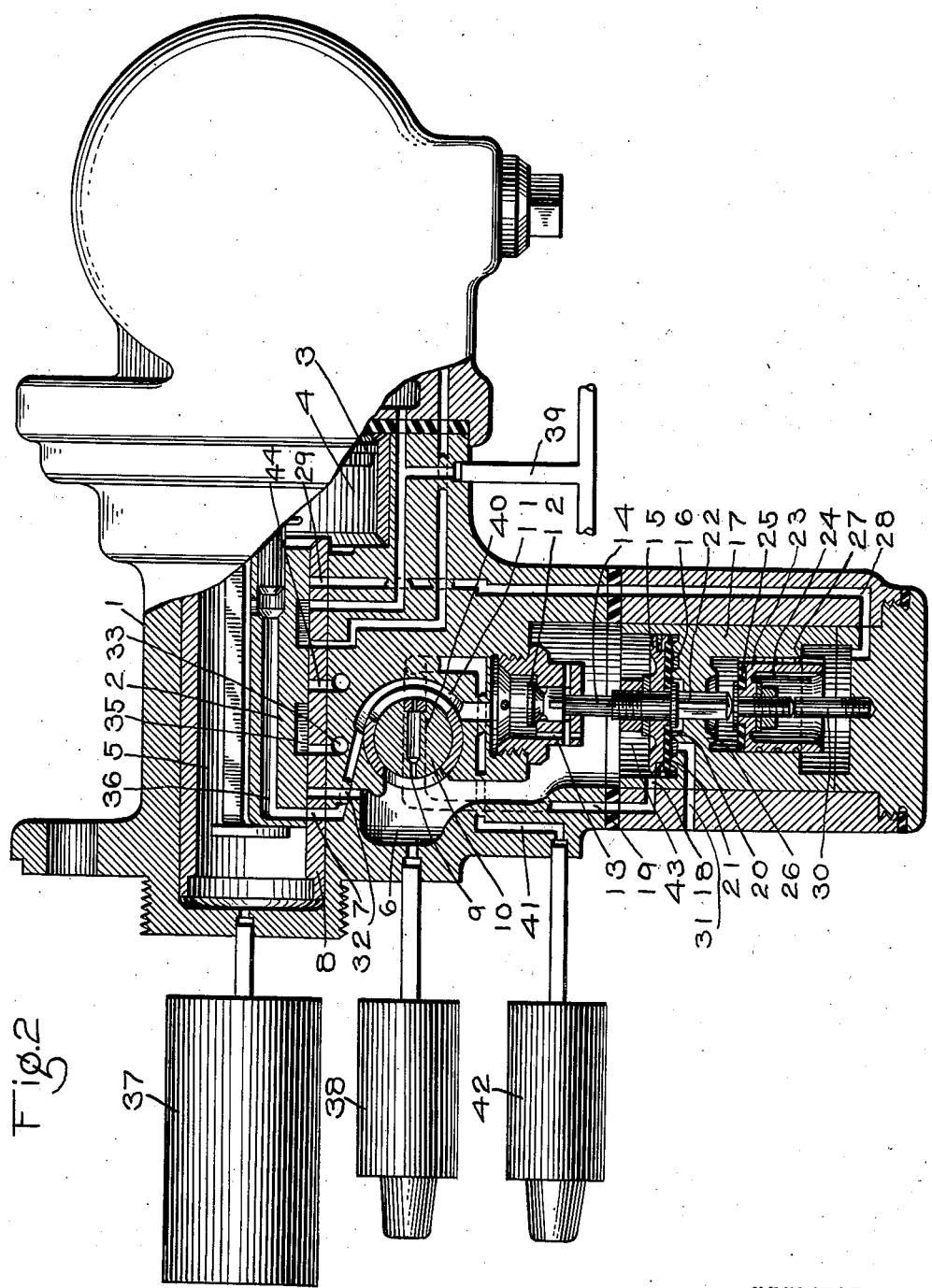

The usual brake cylinder port 7 in the slide valve seat 8 is in permanent communication with the passage 6 through a restricted port 9 in a rotary plug cock 10 and through a wide port 11 with the space above a regulating valve 12 which when in its open position shown in Fig. 1 establishes relatively unrestricted communication between the port 7 and the passage 6, while when the regulating valve 12 is closed as shown in Fig. 2, communication between the port 7 and the passage 6 is only permitted through the port 9 and through a restricted port 13 serving as a by-pass to the valve 12.

The regulating valve 12 is provided with a stem 14 which is secured to or abuts against a piston 15 the underside of which is provided with an annular sealing gasket 16. The piston 15 is adapted to move in a cylinder formed in the upper end of a plug member 17, a port 18 in the cylinder wall is in open communication with a passage 19 which leads through a port 40 in the rotary cock 10 to a passage 41 to a load brake cylinder 42. The base of the cylinder in which the piston 15 moves is formed with inner and outer concentric ribs 20, 21 respectively with which the gasket 16 is adapted to engage when the piston 15 is in its lowermost position as shown in Fig. 2. The piston 15 is provided with a lower valve stem 22 projecting downwardly through a central aperture in the base of the cylinder the lower end of the stem 22 abutting against a lower piston 23 adapted to move in a cylinder 24 formed in the member 17. The upper face of the piston 23 is provided with an annular sealing gasket 25 which when the piston 23 is in its uppermost position as shown in Fig. 1 engages with an annular rib 26 at the top of the cylinder 24.

The piston 23 is provided with a leakage groove 27 establishing restricted communication between the upper and lower faces of the piston and the lower part of the cylinder 24 is arranged to communicate through a passage 28 with a port 29 formed in seat 8 of the slide valve 2. A rod 30 projecting from the base of the cylinder 24 is provided for defining the lowermost position of the piston 23 as shown in Fig. 2.

When the system is being charged up to normal pressure by fluid under pressure supplied from the brake pipe 39 to chamber 4, the valves are in release position, as shown in Fig. 1 of the accompanying drawings, and the port 29 in the slide valve seat 8 is uncovered by the slide valve 2 so that fluid at auxiliary reservoir pressure is supplied from the slide valve chamber 5 to the cylinder 24 by way of port 29 and passage 28.

Under these conditions the piston 23 is maintained in its uppermost position and acting through the stem 22 also maintains the piston 15 in its uppermost position. The piston 15 in turn acting through the stem 14 maintains the regulating valve 12 in its open position.

The ordinary or empty brake cylinder 38 is open to the atmosphere through pipe and passage 6, port 32, cavity 35 and exhaust port 33, while the passages 41 leading to the load brake cylinder 42 is in communication with the atmosphere by way of port 40 in the rotary cock 10, passage 19, port 18 and the atmospheric port 31 which has its initial point located between the annular ribs 20 and 21.

When an application of the brakes is effected in the usual manner by a reduction in brake pipe pressure, the piston 3 and slide valve 2 move to the position shown in Fig. 2 in which the port 29 in the slide valve seat 8 is covered by the slide valve 2.

Fluid under pressure then flows from the valve chamber 5 through the service port 36 to brake cylinder port 7 and port 11 in the cock 10, past the open valve 12 to the passage 6 leading to the ordinary brake cylinder 38, fluid also passing to the brake cylinder through the restricted ports 9 and 13.

Under these conditions the load brake cylinder continues to be in communication with the atmosphere through pipe and passage 41, port 40 in the rotary cock 10, passage 19, port 18 and passage 31, until the pressure in the brake cylinder 38 and chamber 6 has attained a predetermined value dependent upon the relative areas of the pistons 15 and 23, and the brake cylinder pressure acting downwardly upon the upper face of piston 15 overcomes the pressure of the fluid entrapped in the cylinder 24 acting upwardly upon the piston 23, this pressure being transmitted to the piston 15 through the stem 22. The piston 15 accordingly moves downwardly carrying with it the stem 14 and 22 and the piston 23 to the lowermost position as shown in Fig. 2 of the accompanying drawings.

At the beginning of this downward movement of the piston 15, the fluid entrapped in the cylinder 24 below the piston 23 flows through the groove 27 past the stem 22 to the atmosphere by way of port 31 since the gasket 25 has been moved away from the annular rib 26. The continuation of the downward movement of the piston 15, 23 is thus rapidly effected. This downward movement is preferably arranged to occur as soon as the brake cylinder pressure in the passage 6 attains a relatively low value, approaching the atmospheric pressure. The downward movement of the piston 15 permits the regulating valve 12 to move to its closed position in which the unrestricted flow of fluid under pressure past the valve is cut off so that fluid can only now flow from the passage 7 to the passage 6 through the restricted ports 9 and 13.

In this position of the piston 15 the gasket 16 is seated on the annular ribs 20 and 21 and the port 18 is uncovered above the piston 15. Communication between the passage 19 leading to the load brake cylinder and the atmospheric port 31 is consequently cut off and the passage 19 is in open communication with the passage 6, as shown in Fig. 2 of the accompanying drawings.

The fluid under pressure supplied to the passage 6 through the restricted ports 9 and 13 as above described therefore now flows also to the load brake cylinder through port 18, passage 19, port 40 and passage and pipe 41 and both the ordinary and load brake cylinders are thus supplied with fluid under pressure, the load cylinder or cylinders having been supplied after the main cylinder has commenced acting on the brake blocks.

When the brakes are released by the restoration of the brake pipe pressure to its normal value in the usual manner, the triple valve piston 3 returns to the position shown in Fig. 1 in which the slide valve 2 effects the release of fluid from the brake cylinder passage 6 through the port 32, cavity 35 and exhaust port 33 and also again uncovers the port 29 in the slide valve seat 8.

The fluid under pressure supplied to the cylinder 24 as above described passes through the groove 27 to the space within the annular rib 20 and consequently exerts an upward pressure upon the central portion of the lower face of the piston 15. As soon as this upward pressure exceeds the downward brake cylinder pressure upon the upper face of the piston 15, the latter will begin to move upwards thereby venting fluid from the space within the rib 20 and the cylinder 24 above the piston 23 to the atmosphere through port 31. The upper face of the piston 23 being thus subject to atmospheric pressure, the pressure in the cylinder 24 below the piston 23 acting in opposition to the brake cylinder pressure acting on the upper face of the piston 15 will now move the latter to its uppermost position shown in Fig. 1 in which the regulating valve 12 is again open and the piston 15 is above the port 18 of the passage 19.

The fluid contained in the load brake cylinder is thus rapidly released to the atmosphere through passage 41, port 40, passage 19 and port 31 and the load brake cylinder is thus vented completely before the ordinary brake cylinder thereby avoiding any risk of injury to the rack mechanism with which the load brake cylinder is usually provided.

It will be understood that the auxiliary or load brake cylinder is arranged to be rendered inoperative when the vehicle is empty or lightly loaded by rotating the cock 10 so as to cut off communication between the passage 19 and the auxiliary brake cylinder in the usual manner.

The stem 14 may be evidently secured to the piston 15 or may be separate therefrom, the stem 22 being also connected to the piston 15 or not as desired.

According to the modification shown in Figs. 3 and 4 the port 31 of Fig. 1 is replaced by a port 34 of which the initial point is likewise arranged between the annular ribs 20 and 21 and which is controlled by a cavity 35' of the slide valve 2, which is adapted to connect port 34 and the normal brake cylinder release port 32 to the atmosphere by way of port 33. The passage and pipe 41 leading to the load brake cylinder 42 is in communication with the atmosphere through port 40 in the rotary cock 10, passage 19, port 19, chamber 43, port 34, cavity 35' and exhaust port 33 in release position as shown in Fig. 3. Thus both the normal brake cylinder 38 and the load brake cylinder 42 are consequently at atmospheric pressures, so that the brakes are fully released and the pistons 15 and 23 and associated valve 12 assume a release position the same as hereinbefore described with respect to Fig. 1.

The operation during a service brake application of the equipment illustrated in Fig. 4 is substantially similar to that illustrated and fully described with respect to Fig. 2, with the exception that the port 34, which has its initial point arranged between the annular ribs 20 and 21 and which replaces the port 31 of Figs. 1 and 2, is connected to the atmosphere through port 44. The cavity 35' in the slide valve 2 connecting the passage 34 and the passage 44 in the slide valve seat 8 when the piston 3 shifts the slide valve 2 to application position, as shown on Fig. 4 of the accompanying drawings.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake system having a brake pipe, an empty brake cylinder, a load brake cylinder and a brake controlling valve device operative upon a reduction in brake pipe pressure to supply fluid under pressure to both of said brake cylinders, in combination, valve means normally closing communication from said controlling valve device to one of said cylinders and subject to the pressure of fluid in the other of said cylinders, and operative upon a predetermined build up of fluid pressure in said other cylinder to open said communication, and means controlled by the pressure of fluid in said other brake cylinder and an opposing pressure rendered constant upon initiating an application of the brakes for controlling said valve means.

2. In a fluid pressure brake system having a brake pipe, an empty brake cylinder, a load brake cylinder and a brake controlling valve device operative upon a reduction in brake pipe pressure to supply fluid under pressure to both of said brake cylinders, in combination, a movable abutment normally closing communication from said controlling valve device to one of said cylinders and being movable to a position for opening said communication upon a predetermined increase in fluid pressure in the other of said brake cylinders, means for controlling movement of said abutment, said means being subject to fluid under pressure entrapped in a chamber acting in opposition to the pressure of fluid in said other cylinder, said abutment being operative upon a predetermined increase in pressure in said other cylinder to open said communication and to actuate said means to discharge the fluid under pressure entrapped in the chamber.

3. In a fluid pressure brake system having a brake pipe, an empty cylinder and a load brake cylinder and a brake controlling valve device operative upon a reduction in brake pipe pressure to supply fluid under pressure to said brake cylinders to effect an application of the brakes, in combination, means controlled by the pressure of fluid in one of said brake cylinders and an opposing pressure rendered constant upon initiating an application of the brakes for initially providing for flow at a certain rate to said one brake cylinder and operative upon a predetermined build up of pressure in said one brake cylinder to provide for flow at a slower rate to both of said brake cylinders.

4. In a fluid pressure brake system having a brake pipe, an empty brake cylinder, a load brake cylinder and a brake controlling valve device operative upon a reduction in brake pipe pressure to supply fluid under pressure to said brake cylinders to effect an application of the brakes, in combination, a regulating valve for controlling the rate of flow of fluid to said brake cylinders, and means controlled by the pressure of fluid in one of the brake cylinders and an opposing pressure rendered constant upon initiating an application of the brakes for controlling said regulating valve, said means being operative upon a predetermined increase in pressure in one of said brake cylinders to effect a supply of fluid under pressure to the other of said brake cylinders.

5. In a fluid pressure brake system having a brake pipe, an empty brake cylinder, a load brake cylinder and a brake controlling valve device operative upon a reduction in brake pipe pressure to supply fluid under pressure to said brake cylinders to effect an application of the brakes, in combination, valve means for providing for flow at a certain rate to one of said brake cylinders and movable to another position for providing for flow at a slower rate to both of said brake cylinders, means for controlling said valve means and for controlling the supply of fluid under pressure to and its release from the other cylinder, said means being controlled by pressure of fluid in said one brake cylinder and an opposing fluid pressure in a chamber, said controlling valve device being operative to regulate said opposing fluid pressure when the brakes are released and to bottle same in said chamber upon initiating an application of the brakes.

6. In a fluid pressure brake system having a brake pipe, an empty brake cylinder, a load brake cylinder and a brake controlling valve device operative upon a reduction in brake pipe pressure to supply fluid under pressure to said brake cylinders to effect an application of the brake and operative upon an increase in brake pipe pressure to release fluid under pressure from said cylinders to effect a release of the brakes, in combination, a regulating valve for controlling the rate of flow of fluid to the brake cylinders, and means controlled by the pressure of fluid in one of the brake cylinders and an opposing fluid pressure in a chamber for controlling said regulating valve, said brake controlling valve device being operative to regulate said opposing fluid pressure when the brakes are released and to bottle same in said chamber upon initiating an application of the brakes, said means being operative upon a predetermined decrease in the pressure of fluid in the brake cylinders to independently control the release of fluid under pressure from the load brake cylinder.

7. In an empty and load brake equipment having a brake pipe, an empty brake cylinder, a load brake cylinder and a brake controlling valve device operative upon a reduction in brake pipe pressure to supply fluid under pressure to said brake cylinders to effect an application of the brakes, in combination, a valve device operative for one degree of braking to control a first passage through which fluid is adapted to be supplied at a relatively restricted rate to said brake cylinders and a second passage through which fluid under pressure is adapted to be supplied at a relatively unrestricted rate to the load brake cylinder only, said valve device being operative for a different degree of braking to cut off communication through both of said passages, a regulating valve for also controlling the supply of fluid under pressure to said brake cylinders at different rates, and means controlled by the pressures of fluid in the empty brake cylinder and an opposing pressure rendered constant upon initiating an application of the brakes for controlling said regulating valve, said means being operative upon a predetermined increase in pressure in said empty cylinder for effecting the supply of fluid under pressure to said second passage.

8. In an empty and load brake equipment having a brake pipe, an empty brake cylinder, a load brake cylinder and a brake controlling valve device operative upon a reduction in brake pipe pressure to supply fluid under pressure to said brake cylinders to effect an application of the brakes, in combination, a valve device operative for one degree of braking to control a first passage through which fluid is adapted to be supplied at a relatively restricted rate to said brake cylinders and a second passage through which fluid under pressure is adapted to be supplied at a relatively unrestricted rate to the load brake cylinder only, said valve device being operative for a different degree of braking to cut off communication through both of said passages, valve means normally closing communication from said controlling valve device to said second passage and subject to the pressure of fluid in the empty cylinder, said valve means being operative upon a predetermined build up of fluid pressure in said empty cylinder to open said communication, and means controlled by the pressure of fluid in said empty cylinder and an opposing pressure rendered constant upon initiating an application of the brakes for controlling operation of said means.

9. In a fluid pressure brake, in combination, a brake cylinder, a brake pipe and a brake controlling valve device operative upon a reduction in brake pipe pressure to supply fluid under pressure to the brake cylinder to effect an application of the brakes, means controlled by the pressure of fluid in said brake cylinder and an opposing pressure rendered constant upon initiating an application of the brakes for initially providing for a flow at a certain rate to the brake cylinder and operative upon a predetermined build up of pressure in said brake cylinder to provide for a flow at a slower rate to the brake cylinder.

10. In a fluid pressure brake, in combination, a brake cylinder, a brake pipe and a brake controlling valve device operative upon a reduction in brake pipe pressure to supply fluid under pressure to the brake cylinder to effect an application of the brakes, valve means for initially providing for a flow at a certain rate from said controlling valve device to said brake cylinder and movable to a position for providing for a flow at a slower rate to the brake cylinder upon a predetermined build up of fluid pressure in said cylinder, and means for controlling said valve means, said means being subject to entrapped pressure in a chamber acting in opposition to the pressure of fluid in said brake cylinder, said valve means being movable to said position upon a predetermined build up of brake cylinder pressure and being operative upon movement to said position to actuate said means to release the entrapped pressure in the chamber.

THEOPHILE TARISIEN.